United States Patent [19]

Ketterling

[11] Patent Number: 5,402,056
[45] Date of Patent: Mar. 28, 1995

[54] POWER SUPPLY FOR A MOBILE RADIO TRANSCEIVER

[75] Inventor: Hans-Peter Ketterling, Berlin, Germany

[73] Assignee: Robert Bosch GmbH, Stuttgart, Germany

[21] Appl. No.: 58,093

[22] Filed: May 7, 1993

[30] Foreign Application Priority Data

Jun. 9, 1992 [DE] Germany .................. 42 18 852.0

[51] Int. Cl.$^6$ .............................................. H02J 7/00
[52] U.S. Cl. ............................................ 320/6; 320/15
[58] Field of Search ......................... 320/5, 6, 14, 15

[56] References Cited

U.S. PATENT DOCUMENTS

| | | | |
|---|---|---|---|
| 3,821,626 | 6/1974 | Maver et al. | 320/15 X |
| 3,900,784 | 8/1975 | Seike | 320/6 |
| 3,987,352 | 10/1976 | Hirota | 320/6 X |
| 4,056,764 | 11/1977 | Endo et al. | 320/15 X |
| 4,207,511 | 6/1980 | Radke | 320/6 |
| 4,612,492 | 9/1986 | Burk | 320/6 X |
| 4,667,142 | 5/1987 | Butler | 320/6 |
| 4,670,702 | 6/1987 | Yamada et al. | 320/14 X |
| 4,893,348 | 1/1990 | Andoh | 455/89 |
| 4,920,307 | 4/1990 | Iketani | 320/28 |
| 5,218,284 | 6/1993 | Burns et al. | 320/14 |

FOREIGN PATENT DOCUMENTS

| | | |
|---|---|---|
| 3410719 | 10/1985 | Germany . |
| 3923919 | 1/1990 | Germany . |
| 0017834 | 1/1990 | Japan ................ 320/15 |
| 2143094 | 5/1984 | United Kingdom . |
| 2249677 | 10/1991 | United Kingdom . |

OTHER PUBLICATIONS

John D. Spencer et al, "The Voltage Regulator Handbook", 1977, pp. 23–23 and 136–140, Texas Instruments Inc.
Jan M. van der Poel, "Pick the right dc/dc converter for your switch–mode power supply . . . ", Jun. 7, 1978, pp. 104–108, Electronic Design 12.
"Growing Array of 1–chip dc/dc converters provides power for diverse applications", Feb. 18, 1988, pp. 73, 75, 76, 78 and 80, EDN.
Frank Goodenough, "Switch–Mode Regulator ICs, with Controller and Power Switch on One Die Move to Volume Jobs", Jul. 25, 1991, pp. 53, 54, 56, 60–63, 68, 70, 72, 76 and 78, Electronic Design.
Jade Alberkrack, "Build step–up/step–down regulator", Mar. 21, 1985, pp. 271 & 272, EDN.
Data sheet entitled "Linear Integrated Circuits", subtitled Types LM109, LM209, LM309 5–Volt Regulators, from Texas Instruments, 1974.

Primary Examiner—Kristine L. Peckman
Attorney, Agent, or Firm—Frishauf, Holtz, Goodman & Woodward

[57] ABSTRACT

A mobile radio equipment has a built-in storage battery that permits radio equipment to be used outside of the vehicle, but the vehicle's battery and charger are needed to charge up or maintain the charge of the internal storage battery of the radio equipment most of the time. A d.c. voltage converter is used when the radio equipment is in the vehicle to provide at least one voltage which the internal storage battery provides to the radio equipment and that voltage of the internal battery is connected, when the radio equipment is in the vehicle, to the radio equipment through a control switch which is closed only when the output of the voltage converter is less than the voltage of the internal storage battery of the radio equipment. In the power supply located in the vehicle the output of the voltage converter also needs a regulator to supply a regulated voltage to the radio equipment, in addition to the prior unregulated voltage.

14 Claims, 4 Drawing Sheets

POWER SUPPLY FOR A MOBILE RADIO TRANSCEIVER

This invention concerns an electric power supply energized by the storage battery and battery-charging system of a vehicle for supplying current at a voltage suitable for mobile radio equipment which has an internal storage battery, by virtue of which the mobile radio can be used outside of the vehicle. The internal storage battery of the radio equipment can be changed in the vehicle under control of a switch.

There is already a known electric power supply for a mobile radio which is to be energized by an internal or an external rechargeable current and voltage source. The best known circuit does meet the usual technical requirements, but is complicated and expensive with regard to the circuit and has an unfavorable consumption of current.

SUMMARY OF THE INVENTION

It is an object of the present invention to provide an electric power supply for a mobile radio will provide an optimal use of the respective storage batteries within and outside of the radio equipment and will do so with the least possible technological complication.

Briefly, a d.c. voltage converter of the switching type is provided to convert the voltage of the vehicular storage battery to at least one operating voltage required for operation of the radio equipment and a first switch is provided for charging of the internal storage battery of the radio equipment, at least when the radio equipment is in use in a vehicle, whenever the voltage of the output of the d.c. voltage converter exceeds the voltage available at the internal storage battery of the radio equipment.

The advantages obtainable by the invention consist principally in that even when the voltage of the vehicular storage battery deviates from its nominal value, especially when it falls below its nominal value, it is still possible to provide some charge to the internal storage battery of the radio equipment and that, furthermore, the power supply as a whole has a relatively small current consumption.

It is particularly advantageous for the necessary pulsed switching element of a switching type d.c. voltage converter to be also the switch that turns on the d.c. voltage converter and for both that switch and the switch for charging the internal storage battery of the radio equipment to be semiconductor switches and preferably MOSFET transistors. The semiconductor switch that is controlled to charge the internal storage battery of the radio equipment may be usefully bridged by a substrate diode. It is also useful to provide, ahead of the input of the voltage converter, a series MOSFET bridged by a diode and having its gate connected to ground through a voltage-dependent power resistor.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
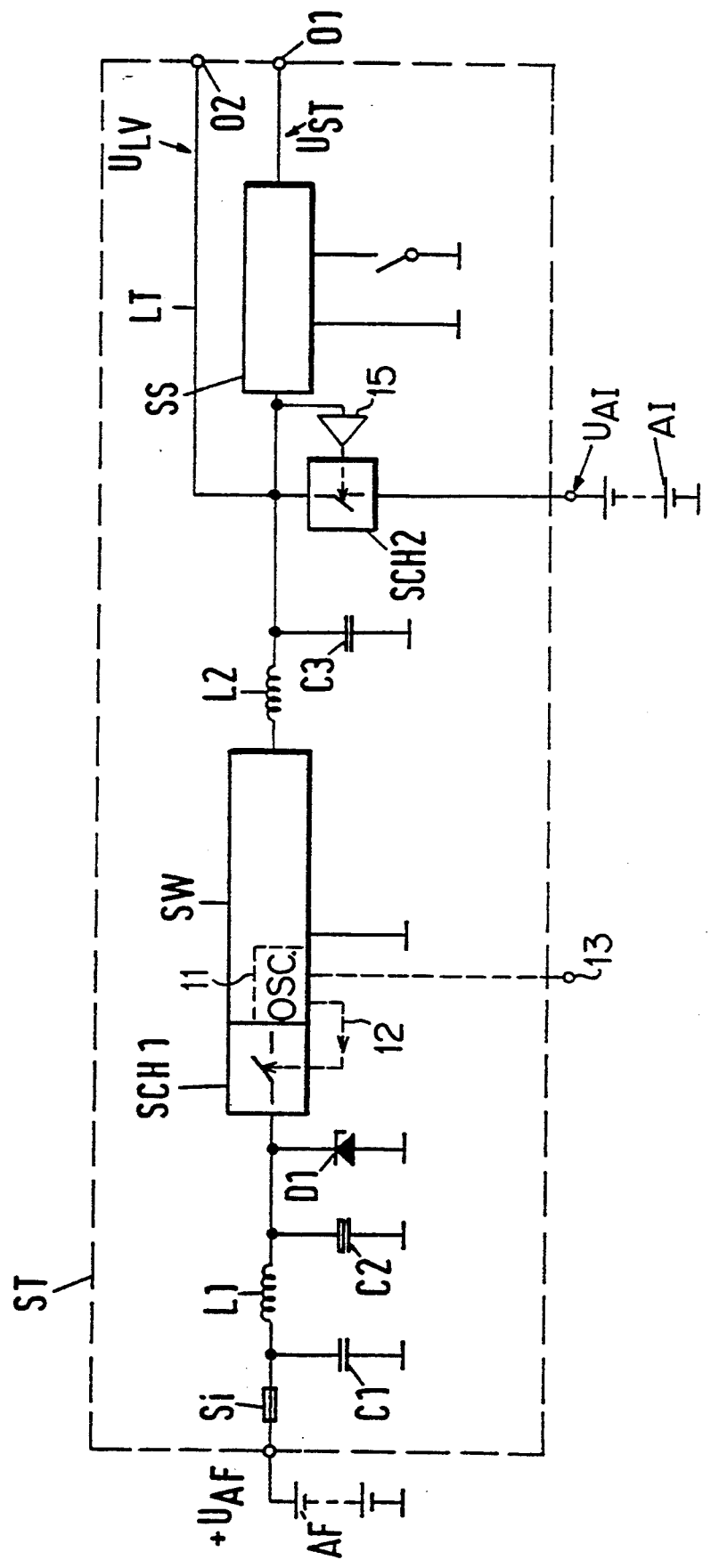
FIG. 1 is a simplified circuit diagram of an electric power supply according to the invention.

ST in FIG. 1 designates a power supply circuit for a radio equipment, such as a transceiver. The radio unit can be used selectively in a motor vehicle or out of the vehicle as a portable device. FIG. 1 also shows a vehicular storage battery AF of which the output voltage $U_{AF}$ which is for example 12 volts. The ungrounded terminal of the vehicular storage battery AF is connected to a first switch SCH1 by way of a safety device, such as a fuse Si or some other kind of interruptor, and a $\pi$ network consisting of a series inductor L1 and two shunt capacitors C1 and C2.

When the first switch SCH1 is closed, the voltage $+U_{AF}$ is supplied to a voltage converter SW. The diode D1, biassed in its blocking direction, may be a Zener diode, a varistor or another voltage-limiting component that at least for a short while can absorb a high loss power and thereby briefly prevent overvoltage peaks of the supply voltage. The diode D1 is connected in parallel with the second capacitor C2, which is preferably an electrolytic capacitor. The first switch SCH1 is preferably a semiconductor switch, which serves simultaneously as main switch for the radio equipment and as an active switching element for the voltage converter SW. In that case an oscillating circuit 11 (see the description below of FIGS. 4A, 4B and 5) which provides the switching necessary for the d.c. voltage converter controls the switch SCH1 by the connection 12. If desired, the enabling and disabling of the radio equipment can be controlled by enabling or disabling the oscillator 11, by means not shown, through the terminal 13.

The output of the voltage converter is connected to an L network composed of a series inductor L2 and a third capacitor C3 in shunt to ground. The junction of L2 and C3 is connected in a first branch circuit to a second switch SCH2 which preferably is likewise a semiconductor switch, through which a connection is possible to the internal storage battery AI of the radio equipment, having its output voltage $U_{AI}$ connected to the second switch SCH2, its other terminal being grounded. In a second branch circuit, the junction of L2 and C3 is connected to a stabilizing circuit SS, the output of which provides the first output 01 of the power supply, while a third branch circuit LT connects the junction of L2 and C3 to second output terminal 02 of the power supply ST. The stabilizing circuit SS may, for example, be a 5-volt regulator, type LM 109, LM 209 or LM 309 available as a linear integrated circuit from Texas Instruments, Inc.

The manner of operation of the above-described power supply illustrated in FIG. 1 is as follows.

The safety device Si is preferably a fuse that operates by melting, which provides the main safety unit for the power supply ST and likewise for the radio equipment connected to it. The π network L1, C1, C2 operates advantageously as an intermediate electric energy storage circuit, but at the same time is a filter for blocking disturbing voltages originating in the voltage converter.

The diode D1 provides overvoltage protection. The L network L2, C3 is provided as a filter for suppressing the switching frequency of the voltage converter SW which is constituted as a switched type of voltage converter. The internal storage battery AI of the radio is charged up or additionally charged through the second switch SCH2 whenever the voltage through the switch is greater than the voltage of the storage battery AI, as determined by the comparator 15 or by one of the circuits shown in FIGS. 6 and 7. The voltage of the storage battery AI provides a support function when there is a deficient storage battery voltage $U_{AF}$ at the vehicle storage battery AF. The filtered output of the voltage converter SW provides an unstabilized d.c. voltage $U_{LV}$ and, through a voltage regulator SS, a stabilized d.c. voltage $U_{ST}$ at first output 01. The unstabilized (higher) voltage $U_{LV}$ is made available at the second output 02, which serves for energizing a high-frequency power amplifier and, if desired, other power units of the radio equipment connected to the outputs 01 and 02.

Figure 2:
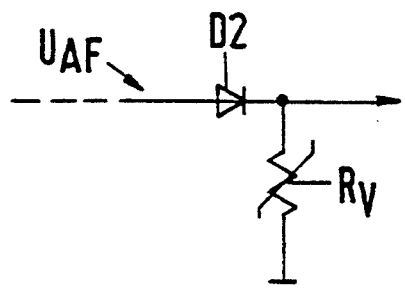
FIG. 2 is a diagram of a protective circuit against overvoltage and wrong polarity.

FIG. 2 shows an optional replacement of the reverse-biassed shunt diode D1, which serves for protection against overvoltage, by a series diode D2 and a voltage-dependent resistor $R_V$ (varistor) connected in shunt.

Figure 3A:
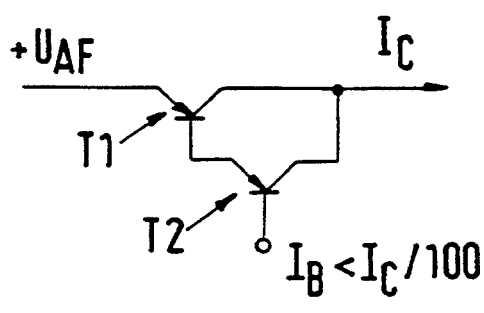
FIGS. 3A, 3B, 3C and 3D are respective circuit diagrams for a main switch for the voltage converter of the power supply and therefore also for the radio equipment located in a vehicle.
Figure 3B:
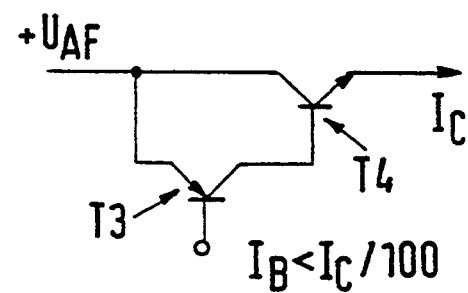

FIGS. 3A, 3B, 3C and 3D show various ways of providing the first switch SCH1 of FIG. 1. FIGS. 3A and 3B respectively show Darlington circuits with pairs of bipolar transistors T1, T2 and T3, T4. The control circuit for base current $I_B$ for turning on the Darlington circuit can be less than one hundredth of the collector current $I_C$. Simple pnp power transistors would indeed permit a small collector-emitter residual voltage, but require a substantially higher base current, however.

Figure 3C:
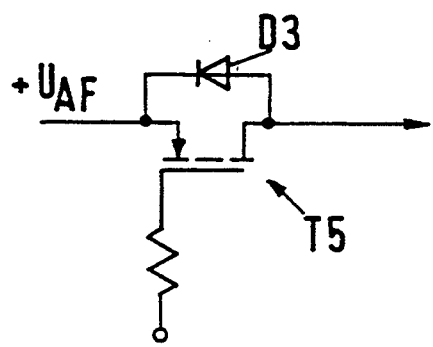
Figure 3D:
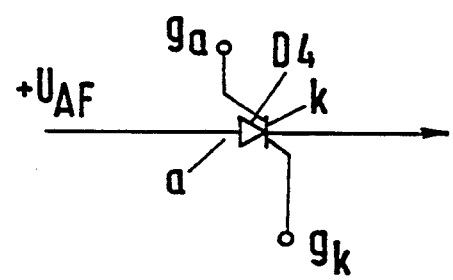

As shown in FIG. 3C, a power-type MOSFET T5 is provided as a series transistor of the voltage converter SW. If a p-channel MOSFET is put in this circuit, an indispensable substrate diode D3 provides an undesired discharge path for the internal storage battery AI of the radio equipment whenever the available voltage $U_{AF}$ that falls below the voltage $U_{AI}$ of the internal storage battery AI of the radio equipment, especially when the vehicle battery voltage necessarily sinks during starting of the vehicle motor. If an n-channel MOSFET is used, the channel resistance is usually smaller, but the substrate diode problem is not thereby avoided; a switch-on voltage is needed, moreover, which is greater than the voltage $U_{AF}$; for this reason success is obtained with a small voltage conversion which does not transmit much energy, but must be constituted as a supplement. That leads to the fact that it is possible to utilize a self-blocking MOSFET. If the combination with a series diode is chosen, the result is a slight overall voltage decrease of about 1 V, even when there are smaller saturation voltages, which means that it is then possible to select also the installation of a quenchable thyristor (D4, FIG. 3D).

Figure 4A:
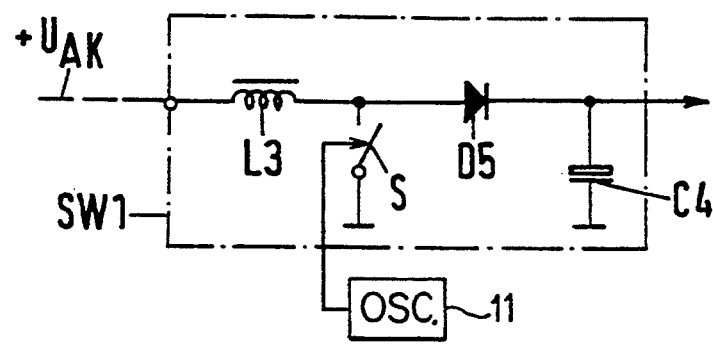
FIG. 4A is a basic diagram of an upwards voltage converter.

In FIG. 4A there is shown a switched type voltage converter SW1 which is an upwards voltage converter and has a series inductor L3 and a diode D5 in series therewith, to which a fourth capacitor C4 is connected, the other terminal of that capacitor being grounded. This fourth capacitor is preferably an electrolytic capacitor. A periodically actuated switching element S for the voltage converter is connected between ground and the common circuit connection between the third inductor L3 and the diode D6. The switching element S in FIG. 4A is preferably provided by a semiconductor switch.

Figure 4B:
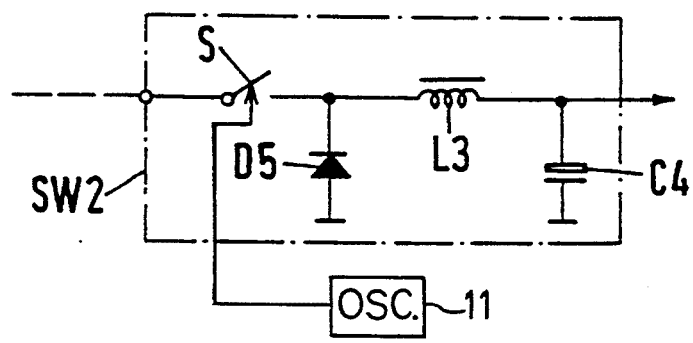
FIG. 4B is a basic diagram of a downwards voltage converter.

FIG. 4B shows how the same components used in FIG. 4A can be utilized to provide a downwards voltage converter SW2.

A preferred manner of operation involves provision of a variable oscillator of the switching type (shown at 11 in FIG. 1), having a controlled switching element S. It permits a moderate amount of adjustability of the conversion ratio. Reducing the oscillator frequency would reduce the conversion ratio of an upwards voltage converter. Such an oscillator can be provided (for example) by only three components: a unijunction field-effect transistor, a capacitance and a resistor, as shown on page 4-32 of the 1981 Radio Amateur's Handbook (58th ed., Am. Radio Relay League).

Figure 7:
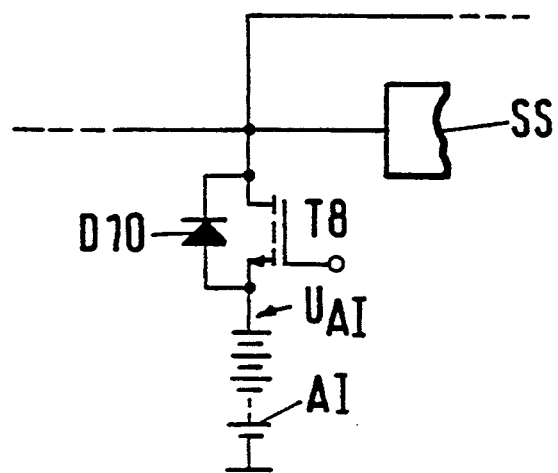
FIG. 7 is a diagram of a semiconductor switch for switching in a connection to the internal storage battery of the radio equipment.

As shown in FIG. 7 the second switch SCH2 is, in accordance with FIG. 1, a shunt transistor T8 which is bridged by a diode D10, which is preferably its substrate diode. A MOSFET is suitable for the transistor T8. When the oscillator includes an inductor and a capacitor connected together, the resistance and capacitance (at least one of which would be variable) should be chosen for an oscillator frequency range that includes a frequency at or near the resonant frequency of the connected inductor and capacitor at one end of the frequency range if a maximum upwards conversion ratio is desired.

It is not necessary to provide a separate oscillator to control the switching element S of FIG. 4A. The switching element can be operated intermittently by feedback in a path (not shown) coming from the ungrounded terminal of the capacitor C4. One possible mode of operation of FIG. 4A is as follows. The switch S closes to energize the coil L3 and at the same time stops current flowing through D5. C4 then discharges and at a certain voltage opens the semiconductor switching element S by a circuit not shown. The energy stored in L3 greatly increases the voltage at D5, which conducts, provides a high output voltage, rising as C4 charges, until at a certain voltage the switching element S is again opened by the unshown feedback path.

The circuit of FIG. 4B (down-converter) also energizes alternately the inductor L3 and the capacitor 4, but in this case the average voltage across the inductor is subtracted from the battery voltage $+U_{AK}$ instead of added to it.

In the self-excited manner of operation of the voltage converters just described, the rate of opening and closing of the switching element S is determined by the inductance of L3 and the capacitance of C4 and will stabilize at or near the resonant frequency of the L3-C4 combination. That could be adjusted by adding or reducing the capacitance, stepwise or continuously, but that would require an adjustable capacitance with a higher voltage rating than an adjustable capacitance in a low-power separate oscillator.

Figure 5:
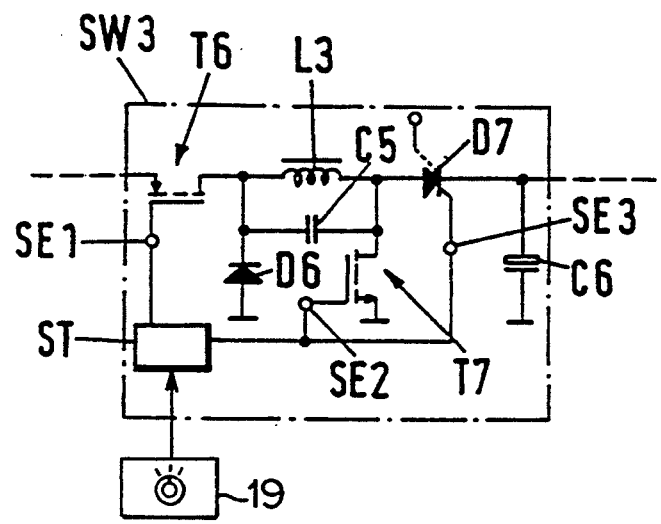
FIG. 5 is a circuit diagram of an up/down voltage converter.

FIG. 5 shows an upwards/downwards voltage converter SW3 produced by a combination of the circuits of FIG. 4A and 4B. This combination circuit has, at its input, a series transistor T6. The following are connected to the series field effect transistor T6: a shunt diode D6, a third series inductor L3, which is bridged by a fifth capacitor C5, a shunt field effect transistor T7 connected to the capacitor C5 and a series diode D7, which is preferably a quenchable thyristor or triac. At the output of the up/down voltage converter SW3 there is a sixth capacitor C6, which is preferably an electrolytic capacitor. According to the magnitude of the voltage $U_{AF}$ of the vehicular storage battery AF, the voltage converter SW3 operates either as an up-converter or as down-converter. Control of these possibilities is performed by an electronic control circuit ST, controllable from a control panel 19. The control circuit ST is connected with control inputs SE1, SE2, SE3 of the circuit elements T6, T7 and D7, and can thereby set the effective circuit.

By installation of a converter of that kind, it is possible not only to cover the energy requirements of the transmitting power amplifier of the radio equipment at low vehicular battery voltage, but also to make available the necessary charging of the internal storage battery AI of the radio equipment in the event of some discharging of that storage battery, without necessity of attaching artificial circuits such as, for example, parallel charging of two storage battery halves or the like. Instead of a thyristor or of a triac for the diodes D6 and D7 a Schottky diode can also be used which guarantees the necessary short switching time at low threshold voltage.

A simplification of the circuit of FIG. 5 is possible if the downwards function of the up/down voltage converter SW3 is not needed; the series transistor T6 can then be replaced by a length of conductor and the diode D6 is omitted. In such a case the diode D7 must be a quenchable rapid thyristor or another electronic switch with similar properties. If, on the contrary, only the down-converter function is needed, then the transistor T7 and the diode D7 can be left out. The series transistor T6 or a quenchable thyristor or triac can simultaneously serve as main equipment switch.

Figure 6:
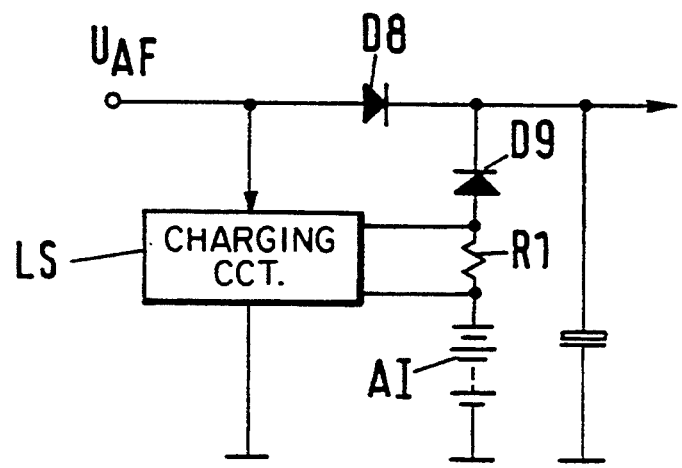
FIG. 6 is a circuit diagram for the coupling in of the internal storage battery of the radio equipment to the electric supply of the present invention.

FIG. 6 shows a coupling-in circuit for the storage battery AI according to FIG. 1, which has a series diode D8 and, in the shunt branch, a series connection of a diode D9 and a resistor R1, with which the storage battery AI is in series. A charging circuit which controls the coupling-in is designated LS. With regard to the circuit of FIG. 5, it should be noted that the function of the diode D8 can optionally be taken over by one of the other circuit components already present. The charge and discharge current of the storage battery AI can be controlled or monitored by the voltage drop at the resistor R1.

Although the invention has been described with reference to particular illustrated examples, it will be understood that variations and modifications are possible within the inventive concept.

I claim:

1. An electric power supply for radio equipment which has an internal storage battery (AI) for supplying current at voltages, including a maximum voltage, suitable for said radio equipment, said internal storage battery (AI) of said radio equipment only intermittently requiring additional power from a vehicular storage battery (AF) having an output voltage and having vehicular battery charging means connected thereto, said electric power supply being connectable to said vehicular storage battery (AF) for use therewith and having a first switch (SCH1,) connected for switching said electric power supply in or out of connection to said vehicular storage battery, said electric power supply further comprising:

a single d.c.-d.c. voltage converter (SW) connectable to said vehicular storage battery (AF) via said first switch (SCH1), for converting electric energy at the voltage ($U_{AF}$) of said vehicular storage battery (AF) into electric energy at an operating voltage ($U_{LV}$) required for operation of said radio equipment and said operating voltage ($U_{LV}$) being provided at an output of said single d.c.-d.c. voltage converter, said single d.c.-d.c. voltage converter being of the switching type;

a second switch (SCH2) connected to said output of said single d.c.-d.c. voltage converter (SW) for connecting said voltage converter output to said internal storage battery (AI) of said radio equipment whenever voltage of said voltage converter output exceeds said maximum voltage of said internal storage battery (AI) of said radio equipment and thereby providing a circuit for charging of said internal storage battery (AI) of said radio equipment.

2. The electric power supply of claim 1, wherein said first switch and said second switch comprise first and second semiconductor switches, respectively.

3. The electric power supply of claim 2, wherein said first and second semiconductor switches comprise MOSFET transistors.

4. The electric power supply of claim 1, wherein said first switch has a control circuit permitting only regularly intermittent connection of said voltage ($U_{AF}$) of said vehicular storage battery to said voltage converter, whereby said first switch also serves as a switching element of said voltage converter.

5. The electric power supply of claim 2, wherein said first switch has a control circuit permitting only regularly intermittent connection of said voltage ($U_{AF}$) of said vehicular storage battery to said voltage converter, whereby said first switch also serves as a switching element of said voltage converter.

6. The electric power supply of claim 3, wherein said first switch has a control circuit permitting only regularly intermittent connection of said voltage ($U_{AF}$) of said vehicular storage battery to said voltage converter, whereby said first switch also serves as a switching element of said voltage converter.

7. The electric power supply of claim 1, wherein said voltage converter is one of an upwards voltage converter, a downwards voltage converter and a combined up/down voltage converter.

8. The electric power supply of claim 2, wherein said voltage converter is one of an upwards voltage converter, a downwards voltage converter and a combined up/down voltage converter.

9. The electric power supply of claim 3, wherein said voltage converter is one of an upwards voltage converter, a downwards voltage converter and a combined up/down voltage converter.

10. The electrical power supply of claim 3, further comprising a substrate diode (D10) bridging said second semiconductor switch (T8).

11. The electric power supply of any one of claims 1–10, wherein:

the connection between said single d.c.-d.c. voltage converter and an output of said electric power supply has a branch connection from a branching point to an input of a voltage regulator circuit (SS); and between said branching point and said output of said single d.c.-d.c. voltage converter there is interposed an L network comprising a series inductance (L2) and a shunt capacitor (C3).

12. The electric power supply of any one of claims 1–10, wherein a voltage-limiting diode (D1) is provided in shunt between ground and the connection between said voltage converter and said vehicular battery (AF).

13. The electric power supply of claim 12, wherein said voltage limiting diode (D1) comprises one of a power-rated Zener diode and a transient suppressor diode.

14. The electric power supply of any one of claims 1–10, wherein:
   said voltage converter includes a power-rated series MOSFET (T5) transistor bridged by a diode (D3); and
   said MOSFET transistor has a gate connected to ground through at least one of a voltage-dependent power resistance and a power varistor ($R_V$).

* * * * *